(12) United States Patent
Young (10) Patent No.: US 6,474,521 B1
(45) Date of Patent: Nov. 5, 2002

(54) MULTIPLE-COMPARTMENT STORAGE CHEST FOR VEHICLES

(76) Inventor: James O. Young, 8155 State Road 130 S., Morganfield, KY (US) 42437

( * ) Notice: Subject to any disclaimer, the term of this patent is extended or adjusted under 35 U.S.C. 154(b) by 0 days.

(21) Appl. No.: 09/697,850

(22) Filed: Oct. 27, 2000

(51) Int. Cl.[7] ................................................. B60R 7/00
(52) U.S. Cl. ...................... 224/404; 224/282; 198/710; 198/800; 296/37.6; 312/268; 312/295
(58) Field of Search .................................. 224/402, 403, 224/404, 282; 312/239, 267, 268, 293.2, 295, 297; 198/800, 710, 713; 296/37.6

(56) References Cited

U.S. PATENT DOCUMENTS

| | | |
|---|---|---|
| 2,729,531 A | 1/1956 | Andersen |
| 2,976,100 A | 3/1961 | Wigley |
| 3,915,531 A | 10/1975 | Morgan |
| 4,288,011 A | 9/1981 | Grossman |
| 4,296,984 A | 10/1981 | Lehman |
| 4,312,550 A | 1/1982 | Jackson |
| 4,643,495 A | 2/1987 | Pepping et al. |
| 4,722,433 A | 2/1988 | Gough |
| 4,821,888 A | 4/1989 | Hankes |
| 4,844,305 A | 7/1989 | McKneely |
| 4,848,626 A | 7/1989 | Waters |
| 4,890,722 A | 1/1990 | Gough |
| 4,936,624 A | 6/1990 | West |
| 4,971,234 A | 11/1990 | Hay |
| 5,088,636 A | 2/1992 | Barajas |
| 5,407,264 A | 4/1995 | Giegerich et al. |
| 5,518,158 A | 5/1996 | Matlack |
| 5,634,577 A * | 6/1997 | Pearson et al. ............. 224/242 |
| 5,727,835 A * | 3/1998 | Krush et al. ................ 224/404 |

* cited by examiner

Primary Examiner—Stephen K. Cronin
(74) Attorney, Agent, or Firm—Woodard, Emhardt, Naughton, Moriarty & McNett (57) ABSTRACT

A storage chest for vehicles comprises a box defining an opening and being sized for mounting to a motor vehicle; a door openably closing off the opening; a plurality of containers sized and shaped to receive and hold one or more items; a motorized drive assembly mounted to the box and connected to the plurality of containers to move the containers in a circuitous path for selective presentation thereof proximal to the opening; and, a subjacent secondary support assembly for supporting the containers.

19 Claims, 6 Drawing Sheets

MULTIPLE-COMPARTMENT STORAGE CHEST FOR VEHICLES

FIELD OF THE INVENTION

The present invention relates to the field of storage chests for vehicles, and more particularly, to a multiple-compartment tool and hardware storage chest for use in the beds of flatbed trucks and pickup trucks.

BACKGROUND OF THE INVENTION

Carpenters, repairmen, mechanics, handymen and the like typically use a great many and variety of tools and hardware which are stored and/or transported to each job site in the user's vehicle. Many such workmen drive standard pickup trucks, the bed of the truck often being uncovered. In many such cases, the workman will keep his tools and hardware in one or more small, portable toolboxes and/or simply lying loose in the bed of the truck. This presents an easy target for thieves and often leads to a jumbled pile of items through which the workman must rummage to find the desired tool, caulking, or widget. Moreover, during transit, such tools and other unsecured items will slide and bounce around the truckbed, resulting in damage to the tool or truck, or worse, loss of the item as it bounces out over the side of the truckbed wall. Toolboxes have been designed that are secured in some fashion to the truckbed or truckbed walls. Examples of devices that have been devises to hold and organize tools, hardware and other such items are shown in the following United States Patents:

| U.S. Pat. No. | Inventor | Title |
|---|---|---|
| 5,518,158 | Matlack | PICKUP TRUCK TAILGATE TOOLBOX ASSEMBLY |
| 5,407,264 | Giegerich et al. | DRIVE MECHANISM FOR MOVING A HORIZONTAL SHELF IN A VENDING MACHINE |
| 5,088,636 | Barajas | ROLLING TOOL BOX |
| 4,971,234 | Hay | PIVOTABLE STORAGE UNIT FOR VEHICLES |
| 4,936,624 | West | TOOL BOX ASSEMBLY |
| 4,890,722 | Gough | METHOD AND APPARATUS FOR CONVEYING MATERIALS |
| 4,848,626 | Waters | UTILITY BOX |
| 4,844,304 | McKneely | CARGO COMPARTMENT ORGANIZER |
| 4,821,888 | Hankes | CAROUSEL MATERIAL HANDLING APPARATUS |
| 4,722,433 | Gough | CONVEYOR OR ELEVATOR SYSTEM |
| 4,643,495 | Pepping et al. | MECHANICAL STORAGE CABINET WITH CONTAINER CONVEYOR |
| 4,312,550 | Jackson | REVOLVING DISPLAY CASE |
| 4,296,984 | Lehman | CABINET STORAGE CONVEYOR |
| 4,288,011 | Grossman | ADJUSTABLE CONTAINER |
| 3,915,531 | Morgan | RANDOM ACCESS STORAGE SYSTEM |
| 2,976,100 | A. K. Wigley | ARTICLE STORAGE ASSEMBLY |
| 2,729,531 | N. Y. Andersen | CONVEYOR TYPE FILE |

While each of the foregoing patents shows a device that helps hold and organize items to be carried in the bed of a vehicle, each has some drawback such as being difficult to use, being complex and expensive to manufacture and/or having a low level of security.

What is needed is a storage device for vehicles that provides improved organization of and access to the tools, hardware and other items contained therein.

SUMMARY OF THE INVENTION

Generally speaking, there is provided a multiple-compartment storage chest for vehicles such as pickup trucks and flatbeds, the chest being mounted in the bed of the truck and having a plurality of containers for holding tools, hardware and the like.

In one embodiment, a storage chest for vehicles comprises a box defining an opening and sized for mounting to a motor vehicle; a door openably closing off the opening; a plurality of containers sized and shaped to receive and hold one or more items; a motorized drive assembly mounted to the box and connected to the plurality of containers to move the containers in a circuitous path for selective presentation thereof proximal to the opening; and, subjacent secondary support means for supporting the containers.

It is an object of the present invention to provide an improved storage chest for vehicles.

It is another object of the present invention to provide a storage chest that provides compartmentalized storage of tools, hardware and the like and operates to present such tools, hardware and the like in selective fashion for access by the user.

Further objects and advantages will become apparent from the following description of the preferred embodiment.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations or modifications in the illustrated device, and any further applications of the principles of the invention as illustrated therein are contemplated as would normally occur to one skilled in the art to which the invention relates.

Referring to FIGS. 1–6, there is shown a multiple-compartment tool and hardware storage chest 10 for use in the bed of a truck in accordance with the preferred embodiment of the present invention. Storage chest 10 is shown positioned for use in the bed of a pickup truck 11 and generally includes an inner box 12, an outer box 13, a chain drive assembly 14 and a plurality of containers 15. While storage chest 10 is shown and described herein for use with a standard pickup truck 10, it is contemplated that storage chest 10 may be adapted for use with other vehicles, as well, such as, without limitation, flatbeds, automobiles and vans.

Inner box 12 holds the chain drive assembly 14 and the containers 15, and inner box 12 is sized to fit within outer box 13. Outer box 13 has a central, generally rectangular section 18 and opposed, left and right supports 19 and 20 extending outwardly from and at the top of central section 18, as shown. Central section 18 is sized to fit between the upstanding side walls 21 and 22 of the truckbed of truck 11, and supports 19 and 20 are sized to extend slightly over the top edges 23 and 24, respectively, of side walls 21 and 22 and to thereby support storage chest 10 thereupon. The height of central section 18 is shown to be less than the height of side walls 21 and 22 so that there remains an unobstructed, cargo-usable gap 26 below storage chest 10. Alternative embodiments include central section 18 having greater or lesser heights, as desired, to vary the internal storage volume of storage chest 10 and the volume of the unobstructed, cargo-usable gap 26 therebelow. Storage chest 10 is secured to side walls 21 and 22 by appropriate fasteners (not shown) such as bolts that extend through left and right supports 19 and 20, from inside storage chest 10, and into side walls 21 and 22. Appropriate cushioning material is positioned between supports 19 and 20 and the top edges 23 and 24.

Figure 1:
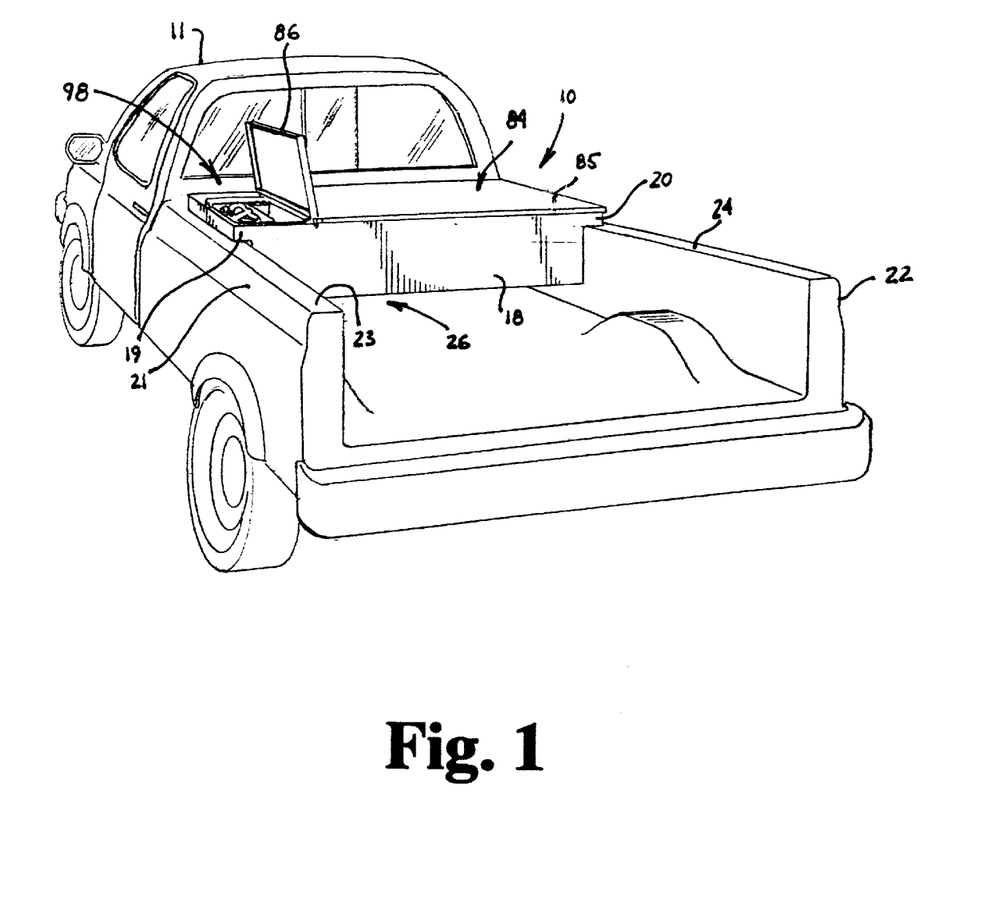
FIG. 1 is a perspective view of a multiple-compartment tool and hardware storage chest 10 in accordance with one embodiment of the present invention, and shown mounted in the bed of a pickup truck 11.
Figures 2, 5:
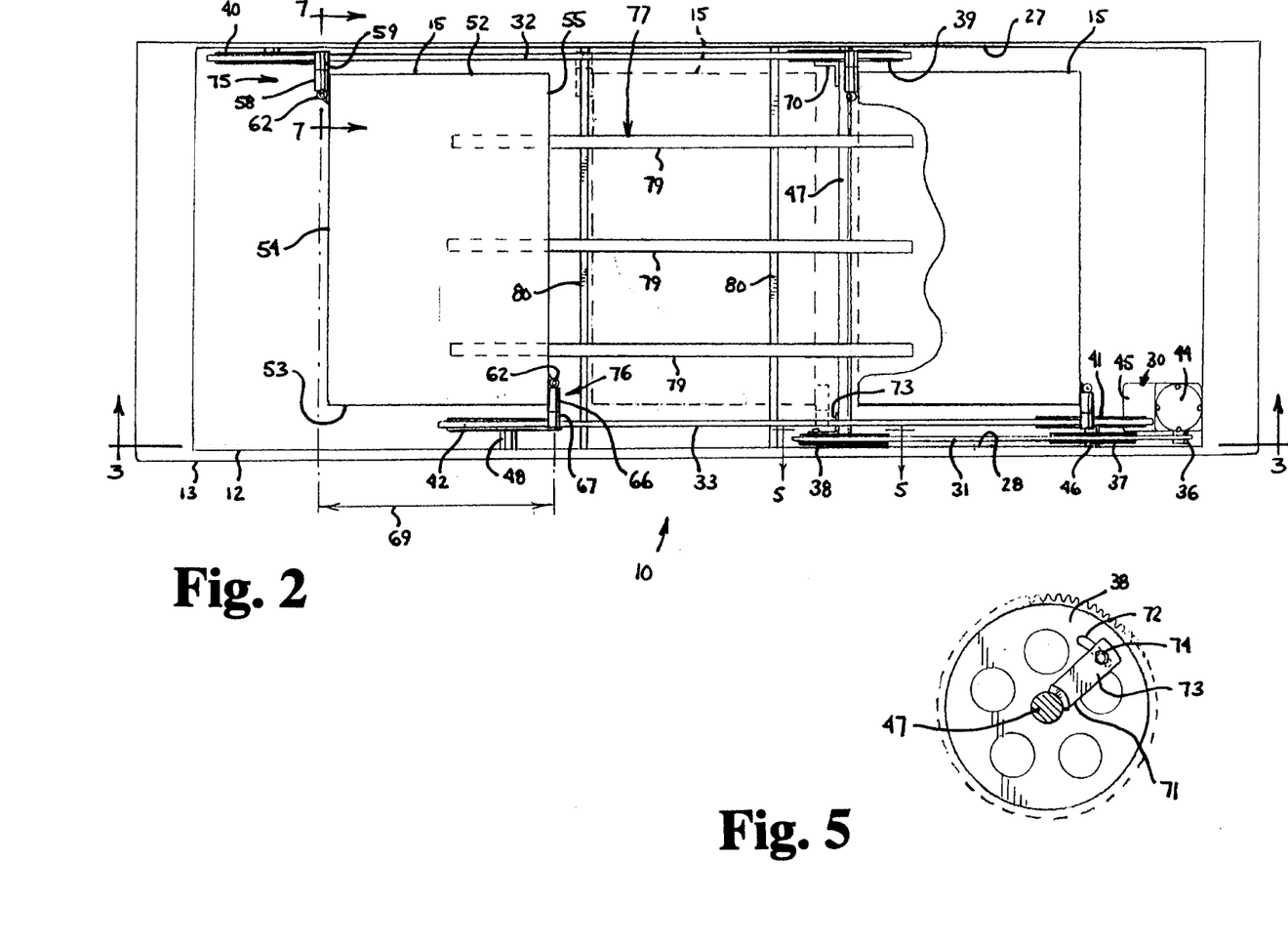
FIG. 2 is top view of the storage chest 10 of FIG. 1 with the top 84 removed and with one and a portion of another bin 15 removed for clarity.
FIG. 5 is a side, cross-sectional view of the drive sprocket 38 and axle 47 of storage chest 10 of FIG. 2 taken along the lines 5—5 and viewed in the direction of the arrows.
Figures 3, 4:
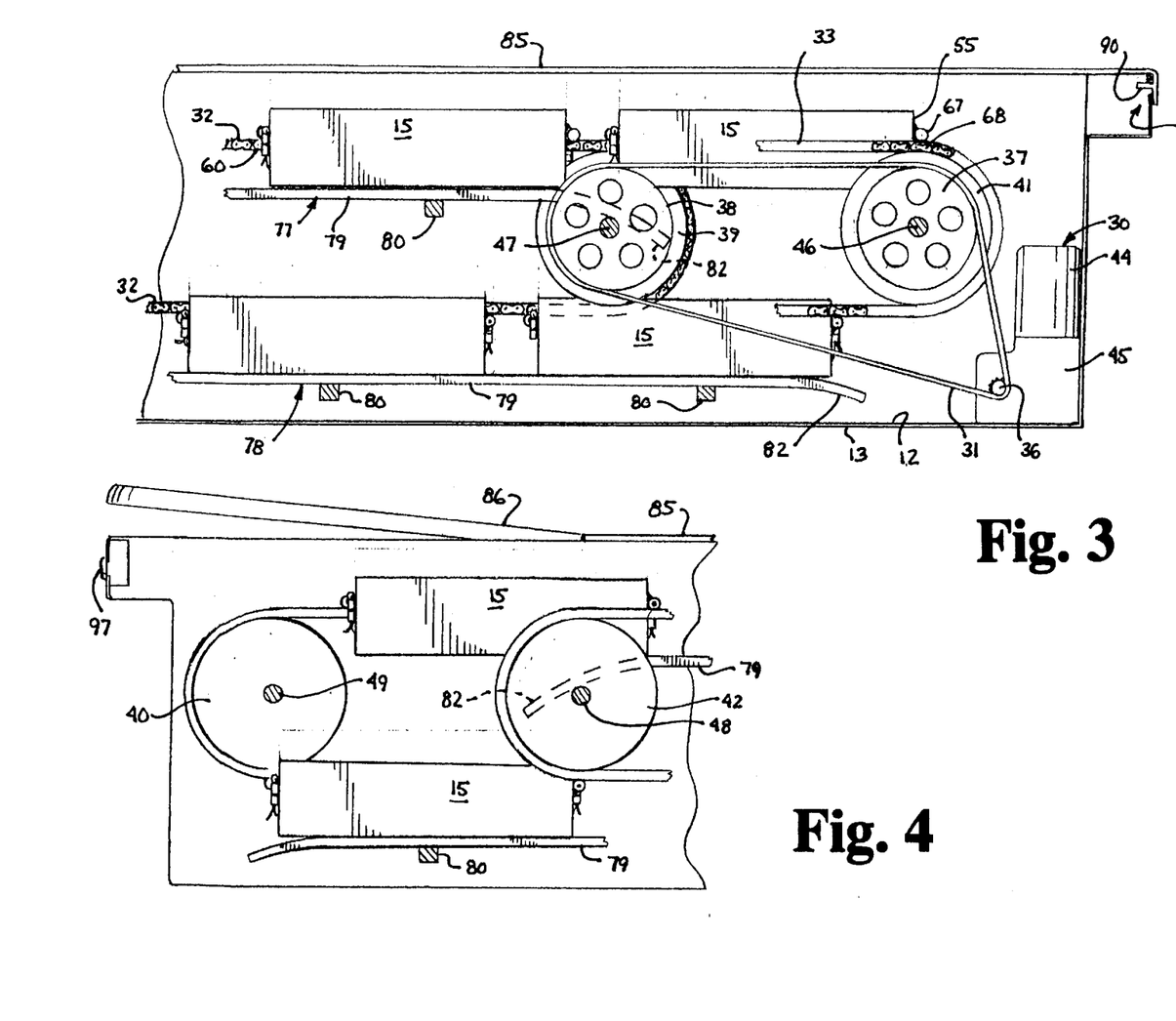
FIG. 3 is a side, cross-sectional view of the storage chest 10 of FIG. 2 taken along the lines 3—3 and viewed in the direction of the arrows, and showing only the right portion of storage chest 10.
FIG. 4 is a side, cross-sectional view of the storage chest 10 of FIG. 2 taken along the lines 3—3 and viewed in the direction of the arrows, and showing only the left portion of storage chest 10.
Figure 6:
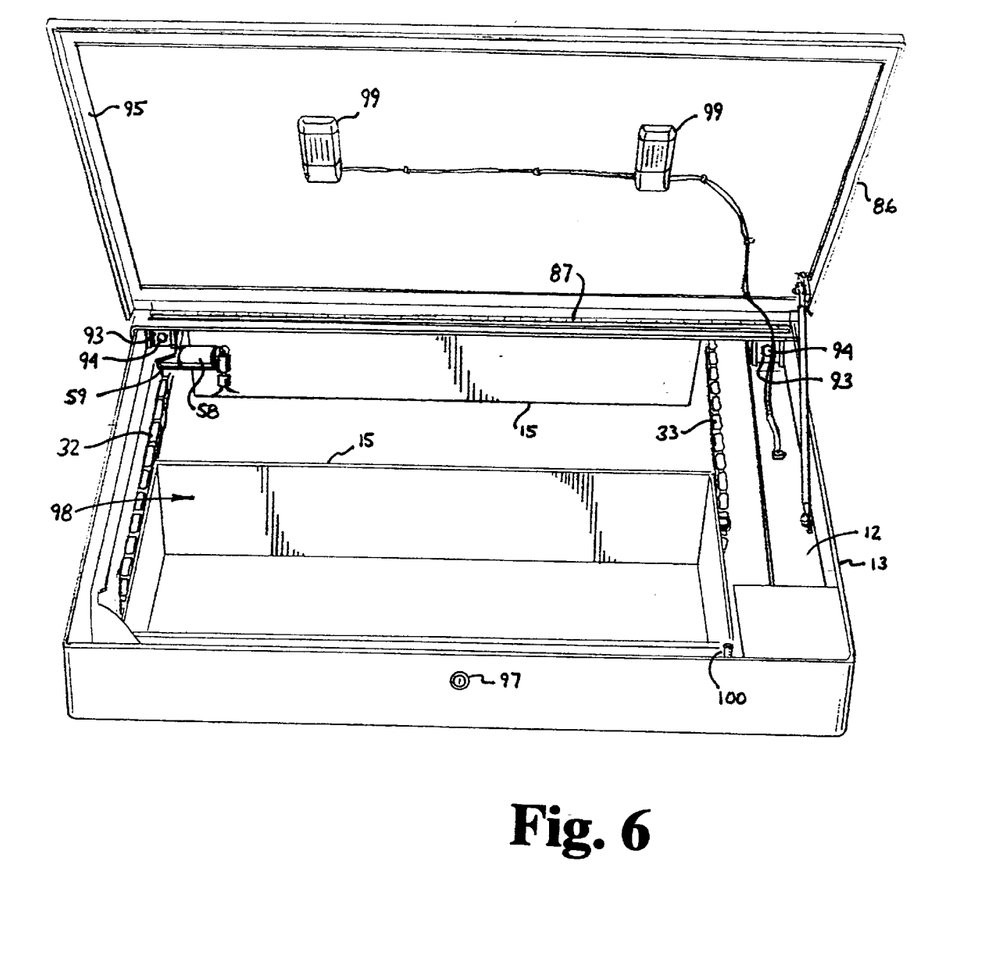
FIG. 6 is a perspective view of storage chest 10 of FIG. 1 showing the access opening 98.

Inner box 12 includes opposing left and right side walls 27 and 28, respectively. Mounted within inner box 12 is chain drive assembly 14, which includes a drive unit 30, a drive chain 31, left and right container chains 32 and 33, drive sprockets 37 and 38, left container chain sprockets 39 and 40, and right container chain sprockets 41 and 42. A drive unit 30 includes a motor 44 and a gearbox 45 and is mounted on the bottom, rear corner of inner box 12. Drive sprocket 36 extends laterally from gearbox 45. Rear drive sprocket 37 and rear, right side container chain sprocket 41 are mounted on a common axle 46, which is mounted for rotation to the right side wall 28 and towards the rear of inner box 12, as shown. Front drive sprocket 38 and rear, left side container chain sprocket 39 are mounted at opposite ends of an axle 47, which is mounted for rotation between the left and right side walls 27 and 28 of inner box 12, as shown. Front, right side container chain sprocket 42 is mounted on an axle 48 that is mounted for rotation to the right side wall 28 and towards the front of inner box 12, as shown. Front, left side container chain sprocket 40 is mounted on an axle 49 that is mounted for rotation to the left side wall 27, towards the front of inner box 12, and forwardly of front container chain sprocket 42, as shown. Drive chain 31 encircles drive sprockets 36, 37 and 38. Container chain 32 encircles left side container chain sprockets 39 and 40, and container chain 33 encircles right side container chain sprockets 41 and 42. In the present embodiment, drive sprocket 36 is a 40×12 (40 chain -12 tooth) sprocket; drive sprockets 37 and 38 are 40×48 sprockets; container chain sprockets 39–42 are 50×42 sprockets; drive chain 31 is a standard #40 roller chain; and, container chains 32 and 33 are 20—#50 roller conveyer pitch chains.

In the present embodiment, there are six generally rectangular containers 15, each having a horizontal width (front and back edges or sides 54 and 55) of approximately 20 inches, a horizontal depth (side edges or sides 52 and 53) of approximately 13 inches, and a height of approximately five inches. Containers 15 are made of any appropriate material such as steel, aluminum or plastic.

Figure 7:
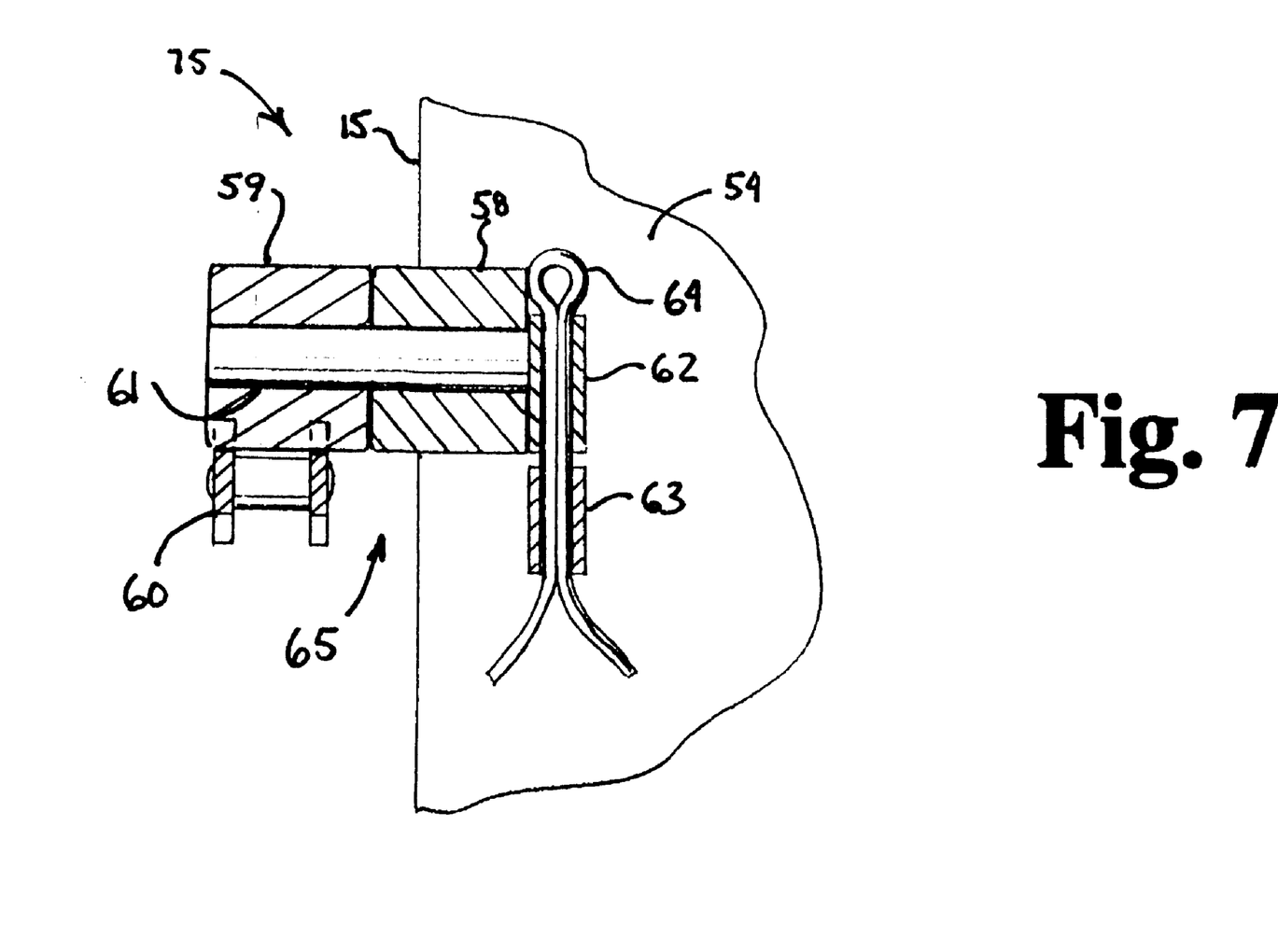
FIG. 7 is a side, cross-sectional view of sleeves 58 and 59 of the connection site 75 of FIG. 2 taken along the lines 7—7 and viewed in the direction of the arrows.

Referring to FIGS. 2, 3 and 7, a container sleeve 58 is fixedly mounted as by welding to the front side 54 of each container 15, at the left side thereof proximal to left side 52 and slightly more than halfway up, as shown. A mating chain sleeve 59 is fixedly mounted as by welding to the top of one of the links 60 of left side container chain 32. A connecting pin 61 extends through both sleeves 58 and 59. An upper locking sleeve 62 is connected as by welding to the inboard end of pin 61. A lower locking sleeve 63 is fixed as by welding to front side 54 in a position whereby, when pin 61 extends through container sleeve 58 until the upper locking sleeve 62 is positioned against the inboard side of sleeve 58, sleeves 62 and 63 are axially aligned, and a cotter pin 64 can be inserted into the central passageways of both sleeves 62 and 63, thereby locking pin 61 within container sleeve 58, as shown in FIG. 7. Container sleeve 58 extends about ⅛ inch outwardly of left side 52, and chain sleeve 59 extends about ⅛ inch inwardly of container chain 32. As a result, there is about a ¼ inch clearance gap 65 maintained between each container 15 and the container chain 32. A similar set of mounting sleeves 66 and 67 are located at the rear side 55 of each container 15, at the right side thereof proximal to right side 53 and slightly more than halfway up, and to the top of one of the links 68 of the right side container chain 33. Thus, each container 15 is supported at opposing connection sites 75 and 76, one at its front left corner by container chain 32 and the other at its right rear corner by container chain 33. The connection sites are on or proximal to the left and right sides. That is, each connection site may be physically connected to one of the left or right sides and/or to the one of the front or rear sides 54 and 55. The longitudinal distance between the connection sites, that is, between container sleeves 58 and 66, is the offset distance 69. This offset provides stability to the container to retard it from rocking along any generally horizontal axis that is perpendicular to the path of the each container.

Because each of chain sleeves 59 and 67 is mounted midway along the top of the corresponding links 60 and 66 of container chains 32 and 33, respectively, the offset distance 69 between the axes of sleeves 59 and 67 of one container is a multiple of the container chain link length. Adjustment is provided to set container chains 32 and 33 in the proper phase so that each box is squarely supported by container chains 32 and 33. This is accomplished by allowing adjustment of the angle of drive sprocket 38 relative to axle 47. Left side container chain sprocket 39 is fixed to rotate with axle 47 by a generally L-shaped bracket 70 that is fixed by any appropriate means, such as welding or screws, to both sprocket 39 and axle 47. A similar, generally L-shaped bracket 71 is similarly fixed to the opposite end of rod 47 (FIGS. 2 and 5), but is adjustably connected to drive sprocket 38 by an arcuate slot 72 in sprocket 38 and an appropriate fastener 74 such as a bolt and nut combination. Fastener 74 extends through a hole in the outboard end of arm 73 and through slot 72 and is tightened to lock axle 47, and consequently container chain sprocket 39, to the desired angular position relative to drive sprocket 38. In the present embodiment, slot 72 sweeps through and provides adjustment through an angle of approximately 20 degrees.

Upper and lower support assemblies 77 and 78, respectively, are provided to subjacently support the containers 15 through the horizontal sections of their cycle.

Each support assembly 77 and 78 includes several secondary support members shown as runners 79, which are connected to cross members 80, which, in turn, extend between and are mounted at their opposing ends to side walls 27 and 28. Each runner 79 is comprised, at least in part, of a material having low coefficient of friction relative to the material of which each container is made. In one embodiment, each runner is made of a metal strip that is topped with a Nylon strip. The forward and rearward ends of each Nylon runner 79 are curved downwardly (at 82) to ensure a smooth transition of each container, which may otherwise rock somewhat as it rotates around the corresponding container chain sprockets and into the horizontal section of its cycle.

Referring to FIGS. 1, 3, 4 and 6, storage chest 10 includes a top 84 that includes a fixed cover 85 and a lid 86 hingedly connected to cover 85 by a hinge 87. Cover 85 is lockably securable to outer box 13 by one or more tabs 90 that extend through mating slots 91 in the rear of outer box 13, and by a pair of mounting flanges 93 that extend downwardly from cover 85 and mate with upwardly extending flanges (not shown) of outer box 13. Appropriate fasteners such as thumb screws or bolts 94 connect the mating flanges and thereby lock the cover 85 to outer box 13. Cover 85 stops short of the front end of outer box 13 (which is at the left side of truck 11 as storage chest 10 is shown mounted to truck 11 in the present embodiment), to provide an opening 98 to access a container 15 positioned thereat, opening 98 being coverable by a door, which in the present embodiment is lid 86. A gasket 95 is attached to the underside perimeter of lid 86 to provide a seal against entry of rain and other undesirable elements when lid 86 is in the closed position. A 20 pound air shock 96 is connected between lid 86 and inner box 12 to both cushion the closing action of lid 86 and to hold lid 86 in the open position, as shown. A pair of lights 99 are mounted to the underside of lid 86, lights 99 having mercury switches to automatically turn the lights on and off whenever lid 86 is open above and below approximately 20 degrees, respectively, from horizontal. Lid 86 may be locked in the closed position by a lock 97.

In the present embodiment, motor 44 is standard DC motor powered directly from the vehicle's battery, but an alternate power source may be used, as well. A two-way activation switch 100 is connected with motor 44 to activate motor 44 and rotate containers 15. Pushing switch 100 one way runs container chains 32 and 33 in one direction, and pushing switch 100 the other way changes the polarity to motor 44 and runs container chains 32 and 33 in the other direction. Containers 15 thus may be rotated in either direction to access a particular container 15 through opening 98 by pushing or pulling switch 100. A cutoff switch (not shown) is located within the vehicle cab and is integrated into the wiring to prevent operation of the chain drive assembly 14 by an unauthorized person. Thus, even if an unauthorized person was able to open lid 86, he or she would have access only to the container, or at most two containers positioned at opening 98. More expensive tools or hardware would be in the containers the user had rotated to the more secure rear part of the storage chest 10 before he locked it.

It is noted that, depending on the dimensions of the containers 15, the container chain sprockets 39–42 and container chains 32 and 33, there must be a gap between adjacent containers (as seen in plan view in FIG. 2), which equates to several links of the container chains 32 and 33. Thus, for example, the distance between adjacent chain sleeves 59 mounted to container chain 32 is equal to offset distance 69 plus two or three links of container chain 32. This is to permit sufficient clearance between the adjacent containers and their contents as they move around the front and rear container chain sprockets.

Alternative embodiments are contemplated wherein storage chest 10 has fewer or greater than six containers 15 and wherein the dimensions of each container 15 varies from the embodiment disclosed herein and from each other. Each container 15 is intended to hold tools, hardware or anything the user desires. The term "container" as used herein is contemplated to include a platform or other structure that is sized and configured to receive and hold one or more items. For example, other embodiments are contemplated wherein the container 15 has a size and dimension to serve as a platform or receptacle for another, removable toolbox or tray that has a complementary shape and size or an otherwise mating configuration to be set upon and held by the platform for storage and transport (like that shown and described for the embodiment of FIGS. 8 and 9). Alternative embodiments are also contemplated wherein the lid 86 may be located at either end, or both ends, or in the middle, of the storage chest.

Figures 8, 9:
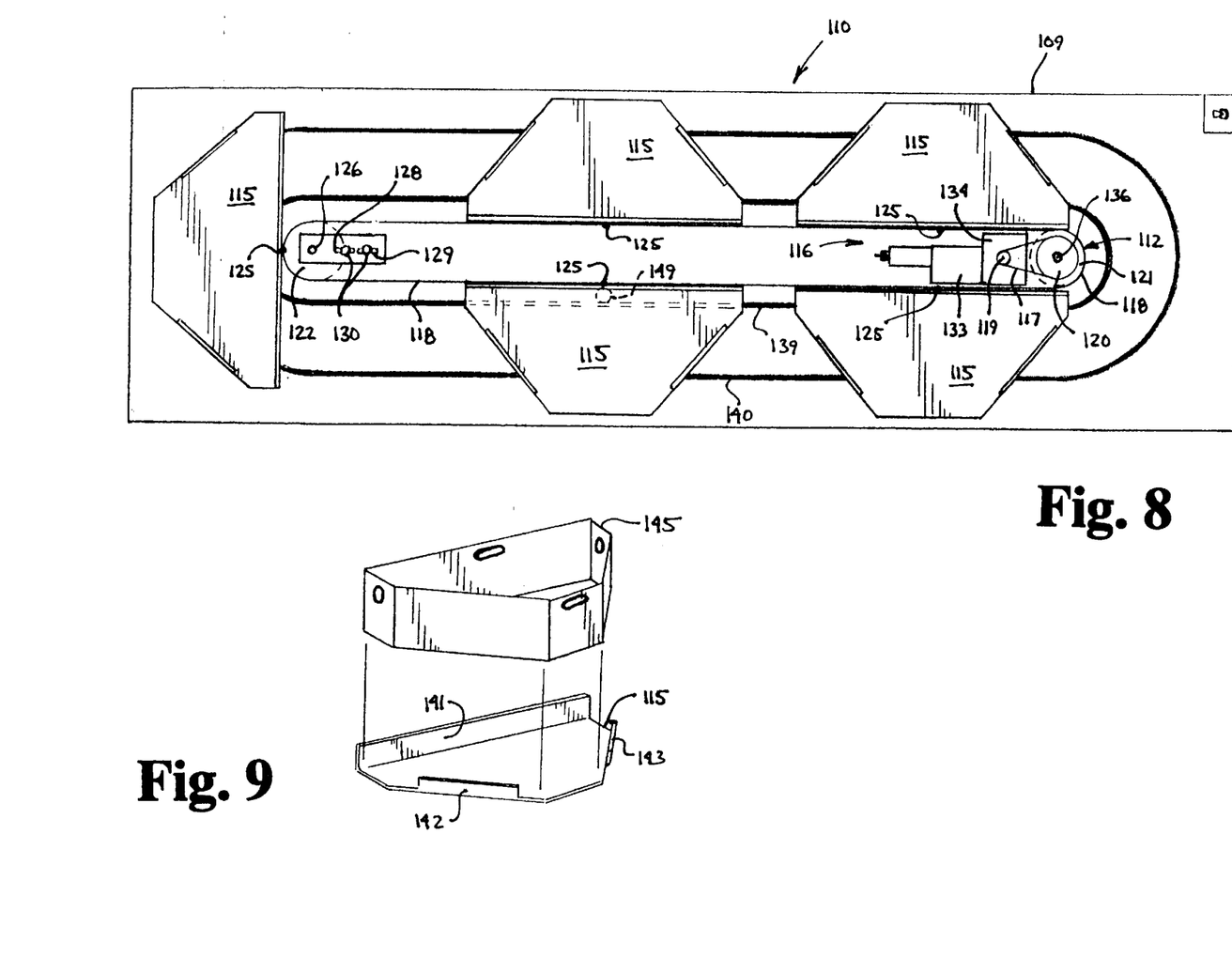
FIG. 8 is a top view of a multiple-compartment tool and hardware storage chest 110 in accordance with another embodiment of the present invention.
FIG. 9 is a perspective view of the tray 145 and platform 115 combination of the storage chest 110 of FIG. 8.

Referring to FIGS. 8 and 9, there is shown an inner box 109 in accordance with an alternative embodiment of the present invention. Like inner box 12, inner box 109 is sized and configured to be received within an outer box 13, and the resulting combination forms an alternative storage chest that is mountable in the bed of a vehicle, as described herein. Inner box 109 holds a chain drive assembly 112 and five container platforms 115. Like the embodiment of FIGS. 1–7, chain drive assembly 112 includes a drive unit 116, a drive chain 117, a platform chain 118, drive sprockets 119 and 120, and platform sprockets 121 and 122. Each platform 115 is pivotally connected at a single pivot member 125 to a link of chain 118. Chain 118 runs around sprockets 121 and 122, which are mounted at opposing ends of inner box 110, as shown. In one embodiment, platform chain 118 is a #60 double pitch chain, and drive chain 117 is a #40 chain. Rear sprocket 122 is rotationally mounted at 126 to a mounting arm 127, which has a pair of slots 128 and 129. A pair of screws 130 extend through slots 128 and 129 to adjustably mount arm 127 to a frame member (not shown) that is mounted to inner box 109. The tension of platform chain 118 is thereby adjustable. Drive unit 116 includes a motor 133, a gearbox 134, and a take-up 135 for adjustment of the tightness of drive chain 117. Drive sprocket 120 and front platform sprocket 121 are mounted to the same axle 136 so that drive sprocket 120 drives front platform sprocket 121.

Container supports are provided in the form of a pair of Nylon wear strips 139 and 140 that are configured as loops and are mounted inside of and to the bottom of storage chest 109, as shown. Each Nylon wear strip comprises ¼×½ inch iron bar with Nylon applied thereto to provide smooth sliding action of the platforms. Nylon wear strips 139 and 140 are shown as narrow strips forming continuous loops, but other embodiments are contemplated wherein the supports may be in other shapes and may be noncontinuous so long as the support(s) provide adequate sliding (or rolling or similar action) moving for the containers 15.

Each of the five platforms 115 is spaced out along the looped length of platform chain 118 to provide adequate clearance for each container as it rotates through it's cycle. Like storage chest 10 described above, the storage chest of the embodiment of FIG. 8 may comprise containers coupled directly to platform chain 118 and with walls high enough to hold the desired tools and other items, or it may comprise the platforms 115 shown in FIG. 8, each platform having rear and front, upstanding retention flanges 141–143, respectively, which together define a cavity for receiving and holding a removable and carriable tray 145. Tray 145 may be provided with holes 146 or similar openings or structure to facilitate its lifting and carrying. A boss 149 extends downwardly from the bottom of each platform 115, near the rear wall 141. As platform 115 sits atop the wear strips 139 and 140, boss 149 rides to the inside of inner wear strip 139 to cause each platform 115 to follow the desired oval circuit defined by inner wear strip 139.

Other embodiments of the present invention are contemplated wherein containers of the storage chest are supported on tracks, chains or platforms that revolve or rotate about two or more axes, and where the axes are vertically or horizontally oriented. Other embodiments are also contemplated wherein the opening in the inner and/or outer boxes for accessing the selectively presented containers therein is closeably and lockably covered by a side-mounted door. The term "door" as used herein is intended to include any appropriate configuration for openably covering an access opening in the inner and/or outer box, and would include, for example, without limitation, hinged double doors or one or more sliding panels.

Alternative embodiments are further contemplated wherein the connection sites for each container are achieved by elements other than sleeves 58 and 66 mounted to opposing front and rear sides at the opposing left and right sides thereof. For example, sleeves could be mounted instead to the opposing side sides 52 and 53, at the front and rear thereof. Alternatively, the left and right sides 52 and 53 could each define an opening into which extend and are pivotally mounted pins (not shown) that are appropriately mounted to the chains 32 and 33.

While the embodiments described herein have incorporated chains as the means for holding and moving the containers, "chain" as used herein is contemplated to include any appropriate device for holding the containers in the proper spaced relationship and for assisting in moving the containers in the desired path to selectively and sequentially present the containers proximal to the opening. Alternative devices would also include, without limitation, belts, ropes, links, cams or arms.

While the invention has been described in detail in the foregoing description, the same is to be considered as illustrative and not restrictive in character, it being understood that only the preferred embodiments have been shown and described, and that all changes and modifications that come within the spirit of the invention are desired to be protected.

What is claimed is:

1. A storage chest for vehicles, comprising:
    a box defining an opening and being sized and configured for mounting to a motor vehicle;
    a door openably closing off the opening;
    a plurality of containers sized and shaped to receive and hold one or more items and having opposing left and right sides and opposing front and back sides;
    a motorized drive assembly connected with said plurality of containers to move said containers in a circuitous path for selective presentation thereof proximal to said opening, wherein said drive assembly includes first and second sprockets mounted to said box for rotation about respective first and second generally horizontal axes and includes third and fourth sprockets mounted to said box for rotation about respective third and fourth generally horizontal axes and includes a first chain encircling the first and second sprockets and includes a second chain encircling the third and fourth sprockets;
    wherein each of said containers has opposing first and second connection sites to the first and second chains, the first and second connection sites being located at the left and right sides respectively and being longitudinally offset from each other, one toward the front side and one toward the rear side, by an offset distance; and,
    subjacent secondary support means for supporting said containers.

2. The storage chest for vehicles of claim 1 wherein each container is a generally rectangular box.

3. The storage chest for vehicles of claim 1 wherein the first connection site is on the front side and connects each container to the first chain and the second connection site is on the rear side and connects each container to the second chain.

4. The storage chest for vehicles of claim 3 wherein the first and second sprockets are forward of the third and fourth sprockets, respectively, by an amount equal to the offset distance.

5. The storage chest for vehicles of claim 4 wherein each of said first and second chains includes an angular position, and wherein said drive assembly includes means for adjusting the angular position of one of the first and second chains relative to the other of the first and second chains.

6. The storage chest for vehicles of claim 1 wherein one of the first, second, third and fourth sprockets is farthest forward and one of the first, second, third and fourth sprockets is farthest rearward and wherein said secondary support means includes at least one runner connected to said box generally between the farthest forward of the sprockets and the farthest rearward of the sprockets.

7. The storage chest for vehicles of claim 6 wherein said at least one runner is comprised, at least in part, of Nylon.

8. A storage chest for vehicles, comprising:
    a box defining an opening and being sized and configured for mounting to a motor vehicle;
    a door openably closing off the opening;
    a plurality of containers sized and shaped to receive and hold one or more items and having opposing left and right sides and opposing front and back sides;
    a motorized drive assembly connected with said plurality of containers to move said containers in a circuitous path for selective presentation thereof proximal to said opening, wherein said drive assembly includes first and second sprockets mounted to said box for rotation about respective first and second generally horizontal axes and includes third and fourth sprockets mounted to said box for rotation about respective third and fourth generally horizontal axes and includes a first chain encircling the first and second sprockets and includes a second chain encircling the third and fourth sprockets;
    wherein each of said containers has opposing first and second connection sites to the first and second chains, the first and second connection sites being located at the left and right sides respectively;
    subjacent secondary support means for supporting said containers; and,
    connection means for connecting said plurality of containers to said drive assembly, said connection means including, for each connection site, a container sleeve mounted to one of the front and rear sides of a container and having a first axis, a mating chain sleeve mounted to one of the first and second chains and having a second axis, and linkage means for detachably linking the container sleeve with the chain sleeve for coaxial rotation about the second axis.

9. The storage chest for vehicles of claim 8 wherein the linkage means includes a pin extendable through both the container sleeve and the chain sleeve, and includes locking means to removable lock the pin with the container and chain sleeve.

10. The storage chest for vehicles of claim 8 wherein there are six of said containers.

11. The storage chest for vehicles of claim 8 wherein each container is a sized and configured to receive a tool tray.

12. A storage chest for vehicles, comprising:
   a box defining an opening and being sized and configured for mounting to a motor vehicle;
   a door openably closing off the opening;
   a plurality of containers sized and shaped to receive and hold one or more items;
   a motorized drive assembly connected with said plurality of containers to move said containers in a circuitous path for selective presentation thereof proximal to said opening, and wherein said drive assembly includes first and second sprockets mounted to said box for rotation about respective first and second generally vertical axes and includes a first chain encircling the first and second sprockets, and wherein said containers move in a generally horizontal path; and,
   subjacent secondary support means for supporting said containers.

13. The storage chest for vehicles of claim 12 wherein each of said containers has opposing front and rear sides, and wherein each of the containers has a first connection site to the first chain, the first connection site being located at the rear side.

14. The storage chest for vehicles of claim 13 including connection means for connecting said plurality of containers to the first chain, said connection means including, for each connection site, a pivot member mounted to one of said container and the chain and permitting the container connected thereat to pivot above a generally vertical pivot axis relative to the first chain.

15. The storage chest for vehicles of claim 14 wherein said secondary support means includes at least one runner connected to said box and positioned to support the containers throughout the majority of their circuitous path.

16. The storage chest for vehicles of claim 15 wherein said at least one runner comprises, at least in part, Nylon.

17. A method for storing and accessing tools, hardware and other items on a vehicle having a bed, comprising the steps of:
   providing a storage chest including a box defining an opening and sized for mounting to a motor vehicle, a door openably closing off the opening, a plurality of containers sized and shaped to receive and hold one or more items, a motorized drive assembly mounted to the box and connected to said plurality of containers to move said containers in a circuitous path for selective presentation thereof proximal to said opening, and subjacent secondary support means for supporting said containers;
   positioning the chest in the bed of the vehicle;
   opening the door;
   operating the drive assembly to move the containers in the path until the desired one of the containers is positioned for access through the opening; and,
   storing in the desired container or accessing from the desired container one or more tools, hardware or other items.

18. The method for storing and accessing tools, hardware and other items of claim 17 wherein said providing step includes said plurality of containers being sized and configured to receive a tool tray and wherein said storage chest includes a plurality of tool trays each sized and shaped to hold one or more tools, hardware or other items.

19. The method for storing and accessing tools, hardware and other items of claim 17 wherein said providing step includes said drive assembly including first and second sprockets mounted to said box for rotation about first and second axes and a first chain encircling the first and second sprockets.

* * * * *